United States Patent Office 2,734,589
Patented Feb. 14, 1956

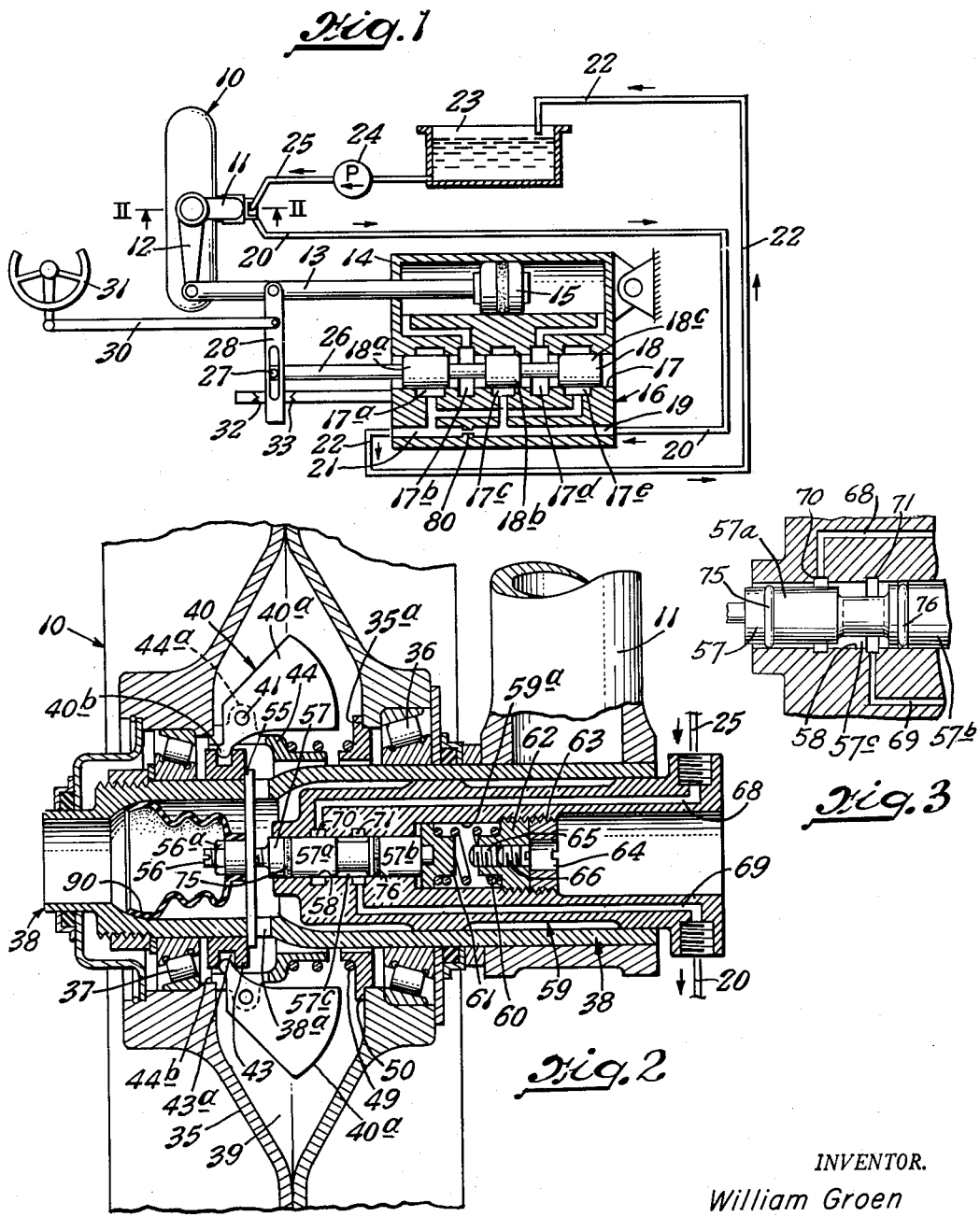

2,734,589

SPEED-RESPONSIVE CONTROL SYSTEM FOR VEHICLE STEERING MECHANISMS

William Groen, Northridge, Calif., assignor to Bendix Aviation Corporation, North Hollywood, Calif., a corporation of Delaware Application May 18, 1953, Serial No. 355,786

11 Claims. (Cl. 180—79.2)

This invention relates to the hydraulic control of vehicles and more specifically to the regulation of the rate of flow of hydraulic fluid used to perform a control function such as steering.

An object of the invention is to provide a practicable valve structure for installation in a wheel that will automatically control the flow of fluid in a hydraulic line proportionately to the speed of rotation of the wheel.

Another object is to provide a speed-responsive hydraulic control system for a vehicle that limits the extent to which control of the vehicle can be exercised at high speed.

Other more specific objects and features of the invention will appear from the description to follow.

The invention is particularly useful in and will be described as applied to a hydraulic wheel-steering system for airplanes to limit the hydraulic steering force that can be applied to the wheel or wheels at high speed. As so used, it functions as a safety device to limit the extent to which direction can be changed and thereby prevent nose wheel gear damage or possible overturning of the airplane in response to excessive turning effort on the part of the pilot.

In the drawing:

Fig. 1 is a schematic diagram, in plan, of a hydraulic steering system incorporating the invention; and Fig. 2 is a vertical sectional view in the plane II—II of Fig. 1 showing a speed-responsive control valve assembly in accordance with the invention.

Fig. 3 is a detail vertical section view in the same plane as Fig. 2, showing details of the valve mechanism to a larger scale.

Referring to Fig. 1, there is shown an airplane wheel assembly 10 comprising a wheel mounted on a strut 11 which is adapted to be rotated for steering purposes by a controlled member consisting of a steering arm 12. The arm 12 is connected to one end of a piston rod 13 of a hydraulic motor constituted by a motor cylinder 14 and a piston 15 therein. Attached to the cylinder 14 is a selector valve 16, defining a valve cylinder 17 which contains a valve piston 18 which has lands 18a, 18b and 18c respectively, which cooperate with ports 17a, 17b, 17c, 17d and 17e respectively in the valve cylinder. The port 17c is a pressure port and is connected to a line passage 19 which in turn is connected to a line 20 extending to a flow-control valve in accordance with the invention which is mounted within the wheel assembly 10. The ports 17a and 17e are return ports and are connected to a line passage 21 which is connected by a return line 22 to a reservoir 23. The reservoir 23 supplies fluid to a pump 24 which delivers it through a line 25 to a valve incorporated in the wheel assembly 10. The port 17b is connected to the left end of the motor cylinder 14, and the port 17d is connected to the right end of motor cylinder 14. It will be noted that pump 24 constitutes a source of pressure fluid connected in series relation with the flow-control valve in the wheel assembly 10 and the line passages 19 and 21 in a single hydraulic circuit.

The selector valve 16 is differentially coupled to a manual control member consisting of a steering wheel 31 and to the controlled member 12. Thus the valve piston 18 is provided with a piston rod 26 having a pin 27 which engages a slot in a lever 28, this lever being pivotally connected at its upper end to the piston rod 13, and, at a short distance below its upper end, to a steering link 30 which is operatively connected to the steering wheel 31. Movement of the lower end of the lever 28 is limited by a pair of stops 32 and 33.

Considering the general operation of the system, it is sufficient at this time to assume that the flow-control valve contained within the wheel assembly 10 offers a high resistance to fluid flow from the pump output line 25 to the pressure line 20 at high speeds of rotation of the wheel, and offers a lower resistance to fluid flow at lower speeds.

When the apparatus is in neutral position as shown in Fig. 1, the piston lands 18a, 18b and 18c block the motor cylinder ports 17b and 17d from each other and from the pressure and return ports, so that the motor piston 15 is hydraulically locked to retain the wheel 10 in whatever steering position it has been set.

Now assume that the steering wheel 31 is rotated in clockwise direction. This moves the link 30 to the left, applying a leftward force to the lever 28 intermediate its ends. The upper end of the lever is restrained against movement by the considerable frictional resistance of the wheel assembly 10 and of the piston 15 in the cylinder 14. Therefore the lever 28 rocks clockwise to shift the valve piston 18 into a left limit position as determined by contact of the lever 28 with the stop 32. In this left limit position, the land 18a uncovers the port 17a to connect the left motor cylinder port 17b to the return line 22, and the land 18b uncovers the pressure port 17c to connect the latter to the right motor cylinder port 17d, thereby causing the motor piston 15 to move to the left and rotate the wheel 10 in clockwise direction. Hence the piston rod 13 is caused to follow the leftward movement of the link 30, and when the latter has moved to the extent desired by the operator and he stops the steering wheel 31, the continued movement of the piston 15 swings the lever 28 counterclockwise about its point of attachment to the link 30 to swing the lower end away from the stop 32 and into neutral position, in which the motor piston 15 is again hydraulically blocked as previously described. If the steering wheel 31 is turned in the opposite direction, to shift the link 30 to the right, the valve functions to deliver pressure fluid to the left end of the cylinder 14 and connect the right end thereof to the return line, to move the piston 15 to the right and cause the motor piston rod 13 to follow the movement of the link 30.

The selector valve 16 incorporates a by-pass orifice 80 which provides a restricted passage by-passing fluid from the pressure line 20 to the return line 22. Thus there is applied to the pressure port 17c a variable pressure dependent upon the rate of flow in line 20. Therefore, it will be observed that the general system of Fig. 1 functions to hydraulically turn the wheel assembly 10 clockwise or counterclockwise with a force and at a rate which is dependent upon two factors: (1) The torque that is applied by the operator to the steering wheel 31; (2) the rate at which fluid is supplied to the pressure line 20 through the flow-control valve incorporated in the wheel mechanism 10. This turning force is resisted by the inherent centering force on the wheel 10 caused by the caster angle of the landing gear and by the friction force between the wheel and ground. If this resisting force is considered to be approximately constant, the maximum angle of rotation of wheel 10 for a given torque applied to steering wheel 31 will be dependent upon the rate of flow in line 20. It is desirable that the wheel 10 be turned through large angles at low speeds, but at high speeds the angle of rotation must be limited to prevent damage to the landing gear.

The flow-control valve in accordance with the present invention which is incorporated in the wheel assembly 10 serves to limit the supply of pressure fluid to the pressure line 20 to a greater extent at high speeds than at lower speeds, to prevent dangerous oversteering at high speeds which might result in an accident. This automatic control valve responsive to the speed of the wheel 10 will now be described.

Referring to Fig. 2, the wheel assembly 10 comprises as its chief elements a wheel 35 rotatably supported by a pair of bearings 36 and 37 upon a tubular axle 38 which is supported by and extends laterally from the lower end of the strut 11. The wheel 35 is so shaped as to define an annular recess 39 axially located between the bearings 36 and 37 and containing centrifugal means responsive to the speed of rotation of the wheel. As shown, this centrifugal means consists of a pair of oppositely disposed bellcranks 40, each mounted by a pivot pin 41 for oscillation with respect to the wheel in a radial plane while rotating with the wheel. Each bellcrank 40 has a mass arm 40a normally extending approximately parallel to the axle 38, and an actuating arm 40b which extends toward the axle into engagement with an annular groove 43a in the external surface of a collar 43 which is slidably mounted upon the axle 38.

The bellcranks 40 may be connected to the wheel 35 by an annular bracket 44 having radially extending lugs 44a between which the bellcranks are mounted and into which the pivot pins 41 extend. The annular bracket 44 has a boss 44b at its left end which fits in a cooperating recess in the wheel 35 and is maintained in this recess by a helical compression spring 49 which is compressed between the bracket 44 and an annular spring retainer 50 which fits against an annular shoulder 35a on the opposite side of the wheel.

It will be observed that swinging movement of the bellcranks 40 on their pivot pins 41, in response to centrifugal force developed therein by rotation of the wheel 35, shifts the collar 43 rightward along the axle 38. Such movement shifts a spider 55, the outer ends of which extend through slots 38a in the axle 38 and rest against the right end of the collar 43. The spider 55 contains a threaded aperture extending axially therethrough which receives a screw 56 formed integrally with and extending from a plunger 57 which is slidably mounted in a valve bore 58 in a valve body 59 which is mounted within the tubular axle 38, in stationary relation with respect thereto. The valve body 59 may be pressed into the tubular axle 38 and projects slightly beyond the supported end thereof. The valve body 59 and plunger 57 constitute a variable-flow control valve to variably throttle fluid flow from the pump 24 to the selector valve 16.

The valve plunger 57 and the spider 55 are urged to the left by a helical spring 60 which is compressed between a spring retainer 61 positioned in a counterbore 59a in the valve body 59 and a threaded retainer 62 which is screwed into a threaded extension 63 of the counterbore 59a. A lock nut, or screw 64, locks the retainer 62 in a desired position of adjustment. A stop screw 65, screwed into an axial threaded aperture in the retainer 62 and backed by a lock screw 66, is adapted to abut against the retainer 61 and positively limit rightward movement of the valve plunger 57. It will be observed that the positions of the retainers 62 and the stop screw 65 can both be adjusted through the open end of the valve body 59. The valve bore 58 in the valve body 59 is provided with a pair of longitudinal spaced ports 70 and 71 which are connected by passages 68 and 69 respectively to the hydraulic lines 25 and 20 respectively. The valve plunger 57 is provided with lands 57a and 57b defining therebetween a recess 57c which is in constant communication with the port 71. The plunger 57 is provided with sealing rings 75 and 76 sealing with the bore 58 on opposite sides of the ports 70 and 71 to prevent leakage from those ports out of the valve bore.

The variable-flow control is not intended to completely block fluid flow from the passage 68 to the passage 69 at any time but to control this flow to an extent dependent upon the speed of rotation of the wheel. To this end the land 57a is of appreciably smaller diameter than the valve bore 58, as shown in Fig. 3, so that there is at all times a limited flow of fluid from the port 70 through the clearance between the land 57a and the wall of the bore to the port 71 and thence through the passage 69 to the line 20. The magnitude of this flow depends upon the length of the portion of the land 57a that is interposed between the port 70 and the port 71. When the wheel is stationary and the bellcranks 40 are in their innermost position as shown in the drawing, the portion of the land 57a interposed between ports 70 and 71 is at its minimum, and the flow between the ports is at its maximum. As the mass arms 40a of the bellcranks 40 move outwardly in response to the increasing centrifugal force developed in response to increasing speeds of rotation of the wheel, the collar 43, the spider 55, screw 56, and the plunger 57 are moved as a unit to the right to increase the length of the land 57a that is interposed between the ports 70 and 71 and thereby increasingly throttle the fluid flow therepast by increasing the length of the restricted flow path. The distance of travel of the plunger 57 and the clearance between the land 57a and the bore 58 are so chosen that above a predetermined speed of rotation of the wheel 35 the maximum possible fluid flow from the pump discharge line 25 to the line 20 leading to the control valve 16 is limited to a value insufficient to impart steering force to the wheel 10 sufficient to cause the upset of the airplane.

It is to be understood that the by-pass bleed passage 80 can be eliminated without entirely destroying the utility of the system, since the speed-responsive valve in the wheel 10 will still prevent sudden steering movement of the wheel at high speeds of rotation, although it will not prevent slow steering movement.

The operative position of the valve plunger 57 at any given speed of rotation of the wheel 35 can be adjusted within limits by means of the screw 56 which is attached to the plunger 57 and threaded through the spider 55. By rotating the screw and piston assembly with respect to the spider 55 the piston can be moved longitudinally relative to the spider and can be locked into a desired position of adjustment by means of a lock nut 56a.

To permit access to the screw 56 while at the same time protecting the movable parts in the wheel assembly from dust, a rubber boot 90 may be provided which extends from the spider 55 into frictional engagement with the inner surface of the tubular axle 38.

Although for the purpose of explaining the invention, a particular embodiment thereof has been shown and described, obvious modifications will occur to a person skilled in the art, and I do not desire to be limited to the exact details shown and described.

I claim:

1. In combination with a vehicle having a controlled member and a wheel assembly including a wheel rotatable at a rate proportional to the speed of the vehicle: a hydraulic motor mechanically connected to said controlled member for moving it; a selector valve having a pair of line passages and selectively actuatable for selectively connecting said motor between said lines passages to energize the motor and apply a moving force to said controlled member in response to a pressure differential between said line passages; a manual control member and means coupling it to said selector valve; a source of pressure fluid; a variable-flow control valve; means connecting said source, said line passages and said control valve in series relation to each other in a single hydraulic circuit; and valve actuating means actuated by said wheel and continuously responsive to variation in the rate of rotation thereof connected to said control valve for actuating it to vary flow therethrough in inverse ratio to the rate of rotation of said wheel.

2. Apparatus according to claim 1 including means defining a by-pass bleed passage interconnecting said line passages for producing a pressure differential therebetween proportional to the rate of flow in said hydraulic circuit.

3. Apparatus according to claim 2 in which said means coupling said manual control member to said selector valve comprises: a differential mechanism differentially coupling said manual control member to both said selector valve and to said controlled member in such sense that force applied from said manual control member to said controlled member aids the force of said motor thereon.

4. Apparatus according to claim 1 in which said wheel assembly comprises, in addition to said wheel, a tubular axle rotatably supporting said wheel and containing said variable flow control valve; said wheel defining a recess, and said valve actuating means comprising: centrifugal means mounted on said wheel in said recess for rotation with the wheel and movement with respect to said wheel by centrifugal force in response to said rotation; said control valve comprising a movable control element, and means coupling said centrifugal means to said control element for rotation of said centrifugal means relative to said control element, and movement of said control element by said centrifugal means in response to said movement of the centrifugal means with respect to said wheel.

5. Apparatus according to claim 4 in which said control valve comprises a valve body defining a valve bore extending axially therein and opening at one end, said bore having a pair of longitudinally spaced ports connected in said series hydraulic circuit; a valve plunger in said bore having a pair of lands on opposite sides of one of said ports and defining a recess in communication with said one port and means sealing between said lands and said bore on opposite sides of said ports; said other port being juxtaposed to one of said lands in the normal position of said plunger, whereby fluid flow between said other port and said recess occurs between the land and the wall of said bore, said plunger constituting said movable control element.

6. Apparatus according to claim 5 in which said centrifugal means comprises a bellcrank in said wheel recess and fulcrum means connecting it to said wheel for oscillation with respect to said wheel in an axial plane, said bellcrank having a mass arm normally extending approximately parallel to said axle and an actuating arm extending toward said axle.

7. Apparatus according to claim 6 in which said coupling means comprises: a collar slideable on said axle and engaging said actuating arm for axial movement thereby; said axle having a plurality of arcuately spaced slots adjacent said collar and a spider within said axle having arms extending through said slots into engagement with said collar for axial movement thereby; and a means connecting said spider to said movable control element.

8. A wheel and speed-responsive valve assembly comprising: a tubular axle; a wheel and a pair of axially spaced bearings rotatably supporting it on said axle, the wheel defining a recess; a flow-control valve within said axle and having a control element movable to vary the fluid flow therethrough; centrifugal means mounted on said wheel in said recess for rotation with the wheel and movement with respect to said wheel by centrifugal force in response to said rotation; and means coupling said centrifugal means to said control element for rotation of said centrifugal means relative to said control element and movement of said control element by said centrifugal means in response to said movement of the centrifugal means with respect to said wheel.

9. An assembly according to claim 8 in which said flow-control valve comprises a valve body defining a valve bore extending axially therein and opening at one end, said bore having a pair of longitudinally spaced ports adapted to be connected between two lines fluid flow between which is to be throttled; a valve plunger in said bore having a pair of lands on opposite sides of one of said ports and defining a recess in communication with said one port and means sealing between said lands and said bore on opposite sides of said ports; said other port being juxtaposed to one of said lands in all longitudinal positions of said plunger whereby fluid flow between said other port and said recess occurs between the land and the wall of said bore; said plunger constituting said control element.

10. An assembly according to claim 8 in which said centrifugal means comprises a bellcrank in said wheel recess and fulcrum means connecting it to said wheel for oscillation in an axial plane, said bellcrank having a mass arm normally extending approximately parallel to said axle and an actuating arm extending toward said axle.

11. An assembly according to claim 10 in which said coupling means comprises: a collar slideable on said axle and engaging said actuating arm for axial movement thereby; said axle having a plurality of arcuate spaced slots adjacent said collar and a spider within said axle having arms extending through said slots into engagement with said collar for axial movement thereby; and means connecting said spider to said valve control element.

References Cited in the file of this patent

UNITED STATES PATENTS

| 2,199,966 | Timm | May 7, 1940 |
| 2,356,492 | Smith | Aug. 22, 1944 |